J. M. DENSMORE.
WOOD RASP.
APPLICATION FILED MAR. 5, 1914.
1,100,544.
Patented June 16, 1914.
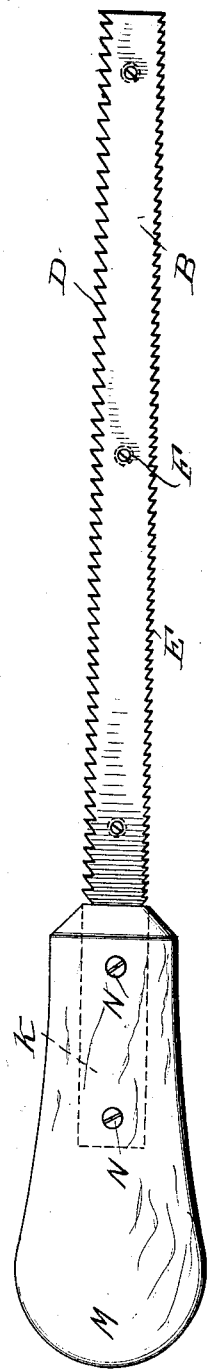
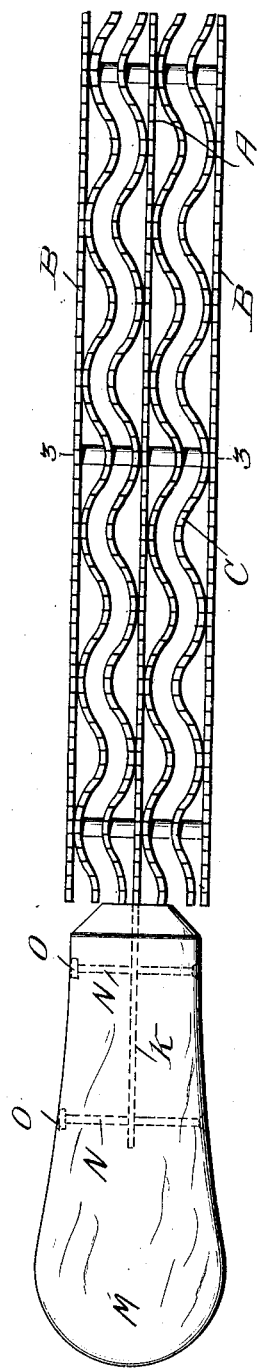
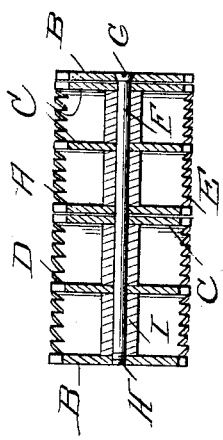
WITNESSES
INVENTOR
JOSEPH M. DENSMORE,
BY
ATTORNEYS

UNITED STATES PATENT OFFICE.

JOSEPH MELVIN DENSMORE, OF ASHLAND, OREGON, ASSIGNOR OF ONE-HALF TO ERNEST V. CARTER, OF ASHLAND, OREGON.

WOOD-RASP.

1,100,544.  Specification of Letters Patent.  Patented June 16, 1914.

Application filed March 5, 1914. Serial No. 822,728.

*To all whom it may concern:*

Be it known that I, JOSEPH MELVIN DENSMORE, a citizen of the United States, and a resident of Ashland, in the county of Jackson and State of Oregon, have invented a new and useful Improvement in Wood-Rasps, of which the following is a specification.

My invention is an improvement in wood rasps, and has for its object to provide a rasp of the character specified, wherein the rasp is formed from a series of independent blades of suitable material arranged alongside each other in spaced relation and rigidly connected together, but capable of detachment, to provide a rasp having openings for permitting the escape of the material cut away, thus increasing the efficiency of the rasp by providing clearance for the material cut away, and preventing the collection of such material in the rasp to block the cutting mechanism, and to provide a rasp that can be sharpened when desired.

In the drawings: Figure 1 is a side view of the improved rasp, Fig. 2 is a top plan view, and Fig. 3 is a section on the line 3—3 of Fig. 2.

The present embodiment of the invention is composed of a series of blades arranged alongside each other in spaced relation, and rigidly connected at spaced intervals. The connection between the blades is detachable, to permit their separation for cleaning or sharpening or for any other purpose.

Two series of blades are provided, one series of straight or plane blades, and another series of waving or sinuous blades. The blades of the first-named series are three in number, a central blade A, and lateral blades B. The blades of the second series are in the present instance four in number, and each of the said blades C is sinuous from end to end, as shown more particularly in Fig. 2. Each of the blades is provided on its opposite side edges with cutting teeth D and E respectively, the teeth D being coarser than the teeth E. The sinuous blades C are arranged as shown in Fig. 2, two of the said blades being arranged at each side of the central blade, and between the said blade and the adjacent lateral blade B. The blades are connected by a series of screw bolts F, having at one end a head G provided with a transverse kerf for engagement by a screw driver or like instrument, and having at the other end a threaded portion H. Three bolts are used in the present instance, one of the bolts being at each end of the rasp, and the other being at approximately the center of the same. Each of the blades A, B and C is provided with transverse openings through which the bolts are adapted to extend, and sleeves or arbors I are arranged on the bolts between the adjacent blades.

The central blade A is extended at one end beyond the other blades, as indicated at K, and a handle M of wood or the like is secured to the extension. The handle or grip M is longitudinally recessed to receive the extension, and screw bolts N are passed through registering transverse openings in the grip and in the extension, for connecting the rasp to the grip or handle. Each bolt is engaged by a nut O, and the heads of the bolts N and the nuts O are countersunk, so that their outer faces are flush with the outer surface of the grip or handle. The heads G of the screw bolts F are also countersunk, and the lateral blade B at the opposite side has a threaded opening for engagement by the threaded portion of the bolt.

The sinuous blades C are arranged in pairs, a pair between each lateral blade and the central blade, and the said blades are so arranged that the alternate arches or curves of the outermost blade of one pair will fit against the inner face of the adjacent lateral blades, while the intermediate curves of the innermost blade of the said pair will fit against the adjacent face of the central blade A. The arrangement of the other pair is reversed, or opposite that of the pair just mentioned, so that the four sinuous blades are parallel throughout their length.

The depth of the arches or curves of the sinuous blades is such that the inwardly extending arches of one member of the pair will almost overlap the outwardly extending arches of the other member of the pair. While a series of seven blades is shown, it is obvious that this arrangement might be varied, a greater or less number of blades being used, in accordance with the width of the rasp desired. The teeth of the blades are cut in accordance with the conditions under which the rasp is to be used, and the teeth at one side of the rasp are preferably larger than the teeth of the other side, so that with a single rasp a coarse cutting surface and a fine cutting surface are provided.

In practice, the rasps will be made of different degrees of fineness for fine and coarse work, and each rasp will preferably have, as before stated, two grades of cutting surfaces. The teeth may be sharpened by filing in the same manner as the teeth of a saw are filed, and by removing the screws F, the rasp may be disassembled to permit any particular blade to be sharpened or to be replaced if broken.

In use the improved rasp is handled in precisely the same manner as the ordinary rasp. The formation of the rasp, that is consisting of separated spaced blades, provides a free discharge for the material rasped away, so that the rasp cannot become clogged and thus less efficient. The sinuous shape of the intermediate blades provides a cutting surface the entire width of the rasp. This arrangement while retaining all of the advantages of the blade construction provides for a cutting surface the complete width of the rasp, thereby preventing an irregular surface cutting.

I claim:—

1. A rasp comprising a plurality of series of blades having teeth at their opposite side edges and arranged alongside each other, the blades of one series being straight and plane, and the blades of the other series being sinuous or waving from end to end, the blades of the first-named series being three in number and arranged in parallel spaced relation, and a pair of blades of the last-named series being arranged between each adjacent pair of the first-named blades, the outwardly arching curves of the outermost blade of each pair of the last-named series contacting with the innermost face of the outermost blade of the first-named series, and the inwardly arching curves of the innermost members of the pairs of blades of the last-named series contacting with the opposite faces of the central blade of the first-named series, said blades having registering openings, screw bolts passing through the openings, spacing sleeves on the bolts between the adjacent blades, and a grip or handle connected with one end of the rasp.

2. A rasp comprising a plurality of series of blades having teeth at their opposite side edges and arranged alongside each other, the blades of one series being straight and plane, and the blades of the other series being sinuous or waving from end to end, the blades of the first-named series being three in number and arranged in parallel spaced relation, and a pair of blades of the last-named series being arranged between each adjacent pair of the first-named blades, the outwardly arching curves of the outermost blade of each pair of the last-named series contacting with the innermost face of the outermost blade of the first-named series, and the inwardly arching curves of the innermost members of the pairs of blades of the last-named series contacting with the opposite faces of the central blade of the first-named series, means for clamping the blades together, and a handle at one end of the blades.

3. A rasp comprising a number of blades arranged alongside each other, one of the said blades being extended at one end beyond the other blades, a grip secured to the extended end, means for detachably connecting the blades in spaced relation, each of the blades having teeth at its side edges, the outermost blades being plane, and sundry of the innermost blades being sinuous from end to end.

4. A rasp composed of blades arranged alongside each other, said blades having their opposite side edges toothed, and the blades being secured together, sundry of the blades being sinuous from end to end.

JOSEPH MELVIN DENSMORE

Witnesses:
W. J. MOORE,
G. HERNDON.